US012682811B1

(12) United States Patent
Ben-Dov et al.

(10) Patent No.: US 12,682,811 B1
(45) Date of Patent: Jul. 14, 2026

(54) COLOR DITHERING USING MULTIPLE THRESHOLD MAPS

(71) Applicant: Amazon Technologies, Inc., Seattle, WA (US)

(72) Inventors: Yuval Ben-Dov, Cambridge, MA (US); Hao Hu, Redwood City, CA (US); Jeffrey Xiaohan Yan, Fremont, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 19/201,157

(22) Filed: May 7, 2025

(51) Int. Cl.
G09G 3/20 (2006.01)
G02F 1/167 (2019.01)
G02F 1/1677 (2019.01)
G09G 3/34 (2006.01)

(52) U.S. Cl.
CPC .......... G09G 3/2044 (2013.01); G02F 1/167 (2013.01); G02F 1/1677 (2019.01); G09G 3/344 (2013.01); G09G 2320/0666 (2013.01)

(58) Field of Classification Search
CPC ..... G09G 2320/066; G09G 2320/0666; G09G 2340/06; G09G 2340/10; G09G 3/2003; G09G 3/2044; G09G 3/2059; G09G 3/344
See application file for complete search history.

(56) References Cited

U.S. PATENT DOCUMENTS

2007/0005795 A1* 1/2007 Gonzalez ................ G06F 16/40
                                                                    375/E7.006
2018/0293775 A1* 10/2018 Janas ...................... G06T 13/80

* cited by examiner

*Primary Examiner* — Insa Sadio
(74) *Attorney, Agent, or Firm* — K&L Gates LLP

(57) ABSTRACT

Systems and methods are described for using multiple threshold maps for color dithering. An example method may comprise determining a tertiary RGB color. The example method may comprise selecting, using data representing the tertiary RGB color, a dithering threshold map indicating a pattern of alternating threshold values. The example method may comprise selecting, based on the tertiary RGB color and the dithering threshold map, a tertiary color value set comprising a red value, a green value, and a blue value. The example method may comprise mapping, based on the dithering threshold map, the alternating threshold values to a pixel set of a portion of an RGB display. The pixel set may include one or more of a red pixel, green pixel, and/or blue pixel. The example method may comprise activating, based on the tertiary color value set and the dithering threshold map, at least in part, the pixel set.

20 Claims, 7 Drawing Sheets
(5 of 7 Drawing Sheet(s) Filed in Color)

100 ⟶

Figure 1:
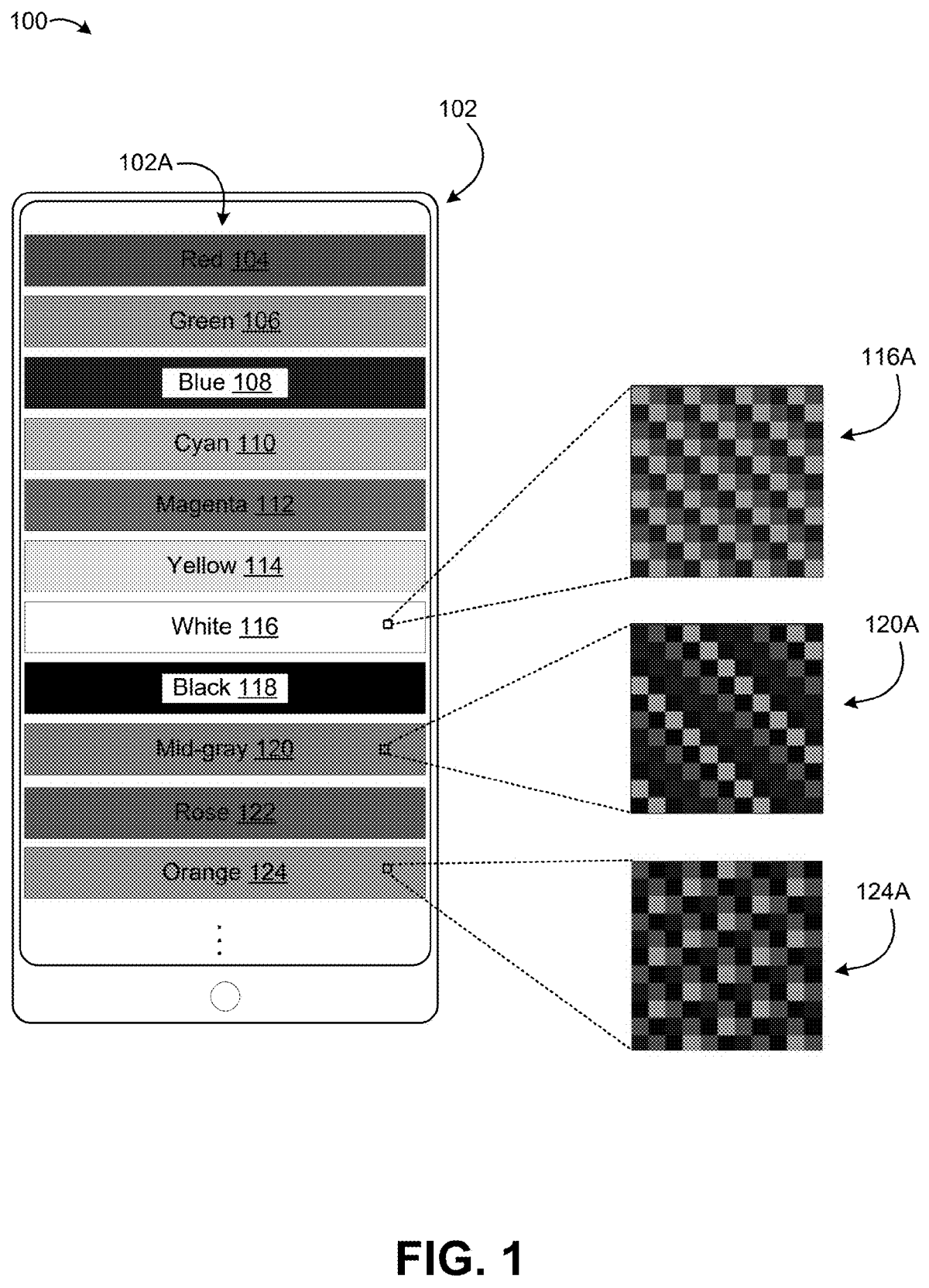

100

102

102A

Red 104

Green 106

Blue 108

Cyan 110

Magenta 112

Yellow 114

White 116

Black 118

Mid-gray 120

Rose 122

Orange 124

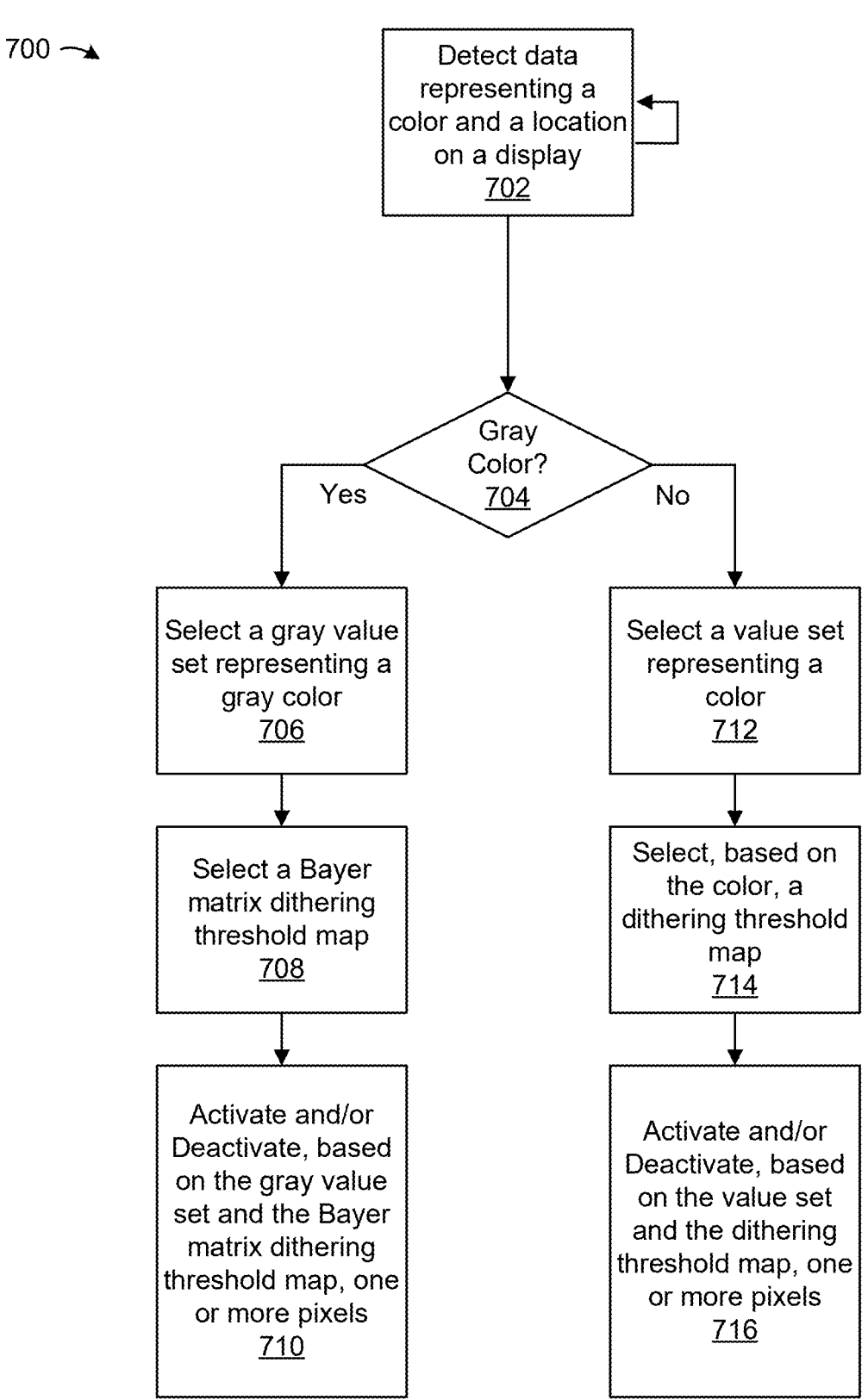

Detect data representing a color and a location on a display
702

Gray Color?
704

Yes

No

Select a gray value set representing a gray color
706

Select a value set representing a color
712

Select a Bayer matrix dithering threshold map
708

Select, based on the color, a dithering threshold map
714

Activate and/or Deactivate, based on the gray value set and the Bayer matrix dithering threshold map, one or more pixels
710

Activate and/or Deactivate, based on the value set and the dithering threshold map, one or more pixels
716

FIG. 7

COLOR DITHERING USING MULTIPLE THRESHOLD MAPS

BACKGROUND

An electronic display can utilize color filters overlaid on display pixels to create a variety of colors from a smaller number of colors, e.g., a display that creates a variety of colors from the three primary Red Green Blue (RGB) colors can be characterized as an RGB display. Color dithering on an RGB display is performed by using adjacent pixels of different colors to simulate intermediate colors. Dithering reduces color banding and creates smoother gradients as the display transitions between colors. Ordered dithering is a technique used to simulate intermediate colors in images with a limited RGB palette by using a fixed pattern to distribute color errors across a display. The distribution of color errors helps to create the illusion of the intended color through a mix of approximate RGB pixels.

BRIEF DESCRIPTION OF DRAWINGS

The patent or application file contains at least one drawing executed in color. Copies of this patent or patent application publication with color drawing(s) will be provided by the Office upon request and payment of the necessary fee.

FIG. 1 illustrates an example system for using multiple threshold maps for color dithering, in accordance with various aspects of the present disclosure.

FIG. 3 illustrates an example alternating dithering threshold map, in accordance with various aspects of the present disclosure.

FIG. 7 illustrates an example flowchart representing control logic for utilizing different threshold maps to render different colors, in accordance with various aspects of the present disclosure.

DETAILED DESCRIPTION

Figure 2:
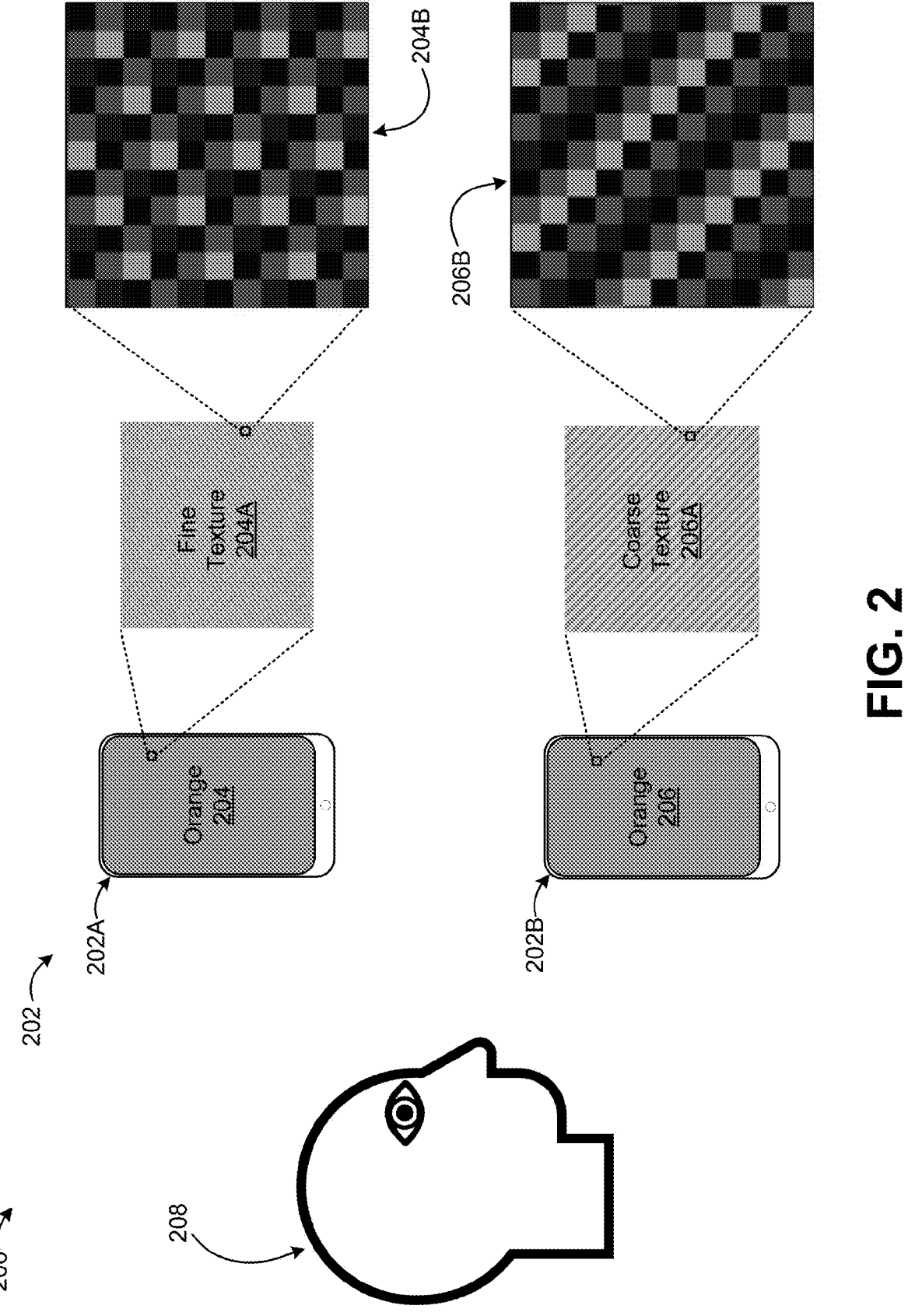
FIG. 2 illustrates an example system utilizing multiple threshold maps to produce an example orange color, in accordance with various aspects of the present disclosure.

In the following description, reference is made to the accompanying drawings which illustrate several examples for the present disclosure. It is understood that other embodiments may be utilized, and that mechanical, compositional, structural, electrical operational changes may be made without departing from the spirit and scope of the present disclosure. The following detailed description is not to be taken in a limiting sense, and the scope of the embodiments of the present invention is defined only by the claims of the issued patent.

Electronic devices, such as e-readers, tablets, and smartphones, which utilize electrophoretic display technology have become useful tools for, among other things, leisure, educational, and professional workplace activities. Individuals may utilize e-readers to download, store, and read digital publications, such as books, newspapers, magazines, etc., in their free time. Students may replace many of their thick, heavy, and cumbersome textbooks with digital copies that can all be stored on a lightweight and easy to carry electronic device. Professionals can also utilize their electronic devices to check emails, access employee manuals and other documents, and organize and synchronize their data across multiple electronic devices. In addition, individuals, students, and professionals may record handwritten notes digitally using their electronic devices by leveraging a stylus and an electrophoretic display which can reduce the need for, and costs associated with, additional physical supplies, such as paper, printers, notebooks, pens, and pencils.

Traditionally, electronic devices, such as e-readers, have been limited to monochrome electrophoretic displays that can render black and white images and text. In order to provide users with more functional features some electronic devices utilize reflective displays with color filter arrays in order to support some limited color palettes which have traditionally included red, green, blue, black, and white color options. For example, some traditional e-readers may be configured with an RGB display that includes a front light panel and an RGB color filter array overlaid on a monochrome electrophoretic display panel with a thin-film transistor backplane. The RGB color filter array overlaid on the monochrome electrophoretic panel may allow the electronic device to render basic colors (e.g., red, green, blue, black, and white color), for instance, when taking notes with a stylus. It should be appreciated that the ink or pigment in each pixel is still black and white in the monochrome electrophoretic panel, however, the color filter applied over the pixel can add a red, green, or blue color to the pixel when the pixel is activated.

In traditional configurations, each pixel can support one color, such as red, green, or blue. For example, in order to show red on the display, the ink under the red color filters would be turned to white and the ink under the green and blue color filters would be turned black. In this configuration, the light that hits the white pixels would be reflected through the red color filters and shown as red light. In addition, the light that hits the black pixels would generally be absorbed and would not reflect through the green or blue color filters resulting in a black color. At a high level, the human eye would perceive the red light and register the pixels as red. Similarly, other colors may be produced by activating some combination of the red, green, and/or blue pixels. Magenta, for example, may be achieved by lighting the red and blue pixels but not the green pixels. Other colors may be obtained by traditional dithering techniques based on the underlying color filter array arrangement.

RGB electrophoretic displays based on the underlying monochrome electrophoretic panels are limited to the same resolution as black and white displays which may result in a coarse textured appearance when rendering some colors (e.g., utilizing traditional dithering techniques). In addition, because traditional RGB electrophoretic displays utilize color filters over the monochrome pixels which add another layer for light to pass through, these RGB displays can suffer from additional reflective light loss resulting in a reduction of screen brightness compared to black and white displays. This reduction of screen brightness is compounded by traditional dithering techniques which may require a large portion of pixels to be deactivated (or turned off), resulting in less reflected light, to produce certain colors.

In contrast to the traditional systems and techniques described above, improved systems and techniques for color dithering using electronic devices are described herein. The present disclosure sets forth systems, methods, and apparatuses that, among other things, provide improved control logic that may utilize a combination of color filter array mapping, Bayer matrix dithering threshold mapping, and/or optimized color specific dithering threshold mapping to produce a variety of different colors and/or texture appearances (e.g., very-fine, fine, coarse, etc.). Additionally, the present disclosure sets forth systems, methods, and apparatuses that, among other things, provide improved control logic that may utilize a combination of optimized color specific dithering threshold mapping and/or variable gray levels to produce a variety of different colors and/or texture appearances. There are many advantages of these, and other examples described herein over traditional systems, such as those traditional systems described above. These approaches may be used for electrophoretic displays and other displays utilizing charged colored particles (e.g., with a charge polarity) and a thin film transistor backplane or other similar mechanism to change positioning of the charged color particles. In accordance with one or more implementations, systems and approaches disclosed herein are utilized in combination with systems and approaches disclosed in U.S. patent application Ser. No. 19/094,409 filed Mar. 28, 2025. U.S. patent application Ser. No. 19/094,409 and any patent application publications thereof and patents issuing therefrom are hereby incorporated herein by reference.

One advantage to leveraging control logic that may utilize a combination of color filter array mapping, Bayer matrix dithering threshold mapping, and/or optimized color specific dithering threshold mapping is that a traditional RGB display (or the like) can produce a wider range of primary, secondary, tertiary, and other colors from the limited RGB palette with variable texture appearance. For example, conventional systems and techniques may be limited to color filter array mapping to produce primary colors and secondary colors or Bayer matrix dithering threshold mapping to produce tertiary colors and gray colors which may result in a coarse texture due to the limited resolution of RGB displays. In contrast, by leveraging control logic that can implement a combination of color filter array mapping, Bayer matrix dithering threshold mapping, and/or optimized color specific dithering threshold mapping, an electronic device can produce colors (e.g., orange) with variable texture appearances (e.g., very-fine, fine, coarse, etc.). It should be appreciated that in addition to allowing for colors that may not be possible with traditional systems and techniques, the addition of different texture appearances may facilitate the rendering of more detailed images and/or more drawing options for a stylus pen with an electronic device.

Moreover, it should be appreciated that such examples as set forth herein solve particular technical problems, such as those identified and described above for traditional electronic devices (e.g., e-readers, tablets, smartphones, etc.). It will be appreciated that the scope of the present disclosure encompasses many potential example embodiments in addition to those described above, some of which will be described in further detail below.

Now that some advantages associated with various systems and processes described herein have been described above in contrast with traditional systems and techniques, an example system for using multiple threshold maps for color dithering will now be described below with reference to FIG. 1.

FIG. 1 illustrates an example system for using multiple threshold maps for color dithering, in accordance with various aspects of the present disclosure. As shown, the system 100 may comprise an electronic device 102 that is configured with control logic (e.g., as described below in connection with FIG. 7) to utilize multiple threshold maps for color dithering in order to produce a plurality of colors 102A. As shown, the electronic device 102 may comprise a screen including a front light, an RGB color filter array panel, a monochrome electrophoretic display panel, a thin-film transistor backplane, and/or the like as described herein. In some examples, the electronic device 102 may comprise an e-reader, a tablet computer, a smartphone, and/or any other electronic device(s) as described herein. In some examples, the electronic device 102 may comprise, at least in part, one or more of the electronic device 202 (as described below in connection with FIG. 2), the electronic device 402 (as described below in connection with FIG. 4), and/or the electronic device 600 (as described below in connection with FIG. 6).

The plurality of colors 102A, as shown, may comprise at least one of a binary color, a tertiary color, and/or any other colors that may be produced, rendered, and/or displayed on an electronic device utilizing an additive (e.g., RGB) color model. In some examples, a binary color may comprise a primary color (e.g., a primary RGB color) and/or a secondary color (e.g., a secondary RGB color). In the RGB color model, a primary RGB color may comprise red, green, or blue. In the RGB color model, a secondary RGB color may comprise cyan, magenta, or yellow. In the RGB color model, a tertiary RGB color may comprise spring green, chartreuse-green, orange, rose, violet, or azure. In some examples, other quaternary colors (e.g., a quaternary RGB color) and/or higher orders of colors may be possible by varying pixel values in the RGB color model from an integer value of 0 to an integer value of 255 in the 8-bit RGB color space. For example, an amber or a golden yellow color may be produced (or rendered) using the color value set of {Red=1, Green=0.75, Blue=0}. In such examples, an integer value of 0 in the 8-bit RGB color space means no intensity or that the pixel is completely deactivated or turned off. In addition, an integer value of 255 in the 8-bit RGB color space means full intensity or that the pixel is completely activated or turned on. In some examples, integer values between 0 and 255 represent a respective level of partial intensity. For example, an integer value of 127 may represent a partial intensity of 50% (e.g., to within a ±10% tolerance) and an integer value of 64 may represent a partial intensity of 25% (e.g., to within a ±10% tolerance).

As shown, the plurality of colors 102A may comprise one or more shades of red 104, green 106, blue 108, cyan 110, magenta 112, yellow 114, white 116, black 118, mid-gray 120, rose 122, orange 124, and/or the like as described herein. In the depicted example, the colors of red 104, green 106, blue 108, cyan 110, magenta 112, yellow 114, white 116, and/or black 118 may represent binary colors because they can be rendered by the electronic device 102 by fully activating and/or fully deactivating the red, green, and/or blue pixels on at least a portion of the display of the electronic device 102. For example, the electronic device 102 may render the red 104 color by activating all of the red pixels and deactivating all of the green pixels and the blue pixels (e.g., represented by {1, 0, 0} or {255, 0, 0}). Additionally, or alternatively, the electronic device 102 may render the cyan 110 color by deactivating all of the red pixels and activating all of the green pixels and the blue pixels (e.g., represented by {0, 1, 1} or {0, 255, 255}). In some examples, one or more colors as described herein may be represented as a hexadecimal color code, for example, red 104 may be represented by the hexadecimal color code of 0xff0000 (or #ff0000). Table A, as shown below, provides a list of the binary colors and the combination of RGB pixels that represent each respective binary color.

TABLE A

| Binary Color | {R, G, B} |
|---|---|
| Red | {1, 0, 0} or {255, 0, 0} |
| Green | {0, 1, 0} or {0, 255, 0} |
| Blue | {0, 0, 1} or {0, 0, 255} |
| Cyan | {0, 1, 1} or {0, 255, 255} |
| Magenta | {1, 0, 1} or {255, 0, 255} |
| Yellow | {1, 1, 0} or {255, 255, 0} |
| Black | {0, 0, 0} |
| White | {1, 1, 1} or { 255, 255, 255} |

As shown, the electronic device 102 may receive data (e.g., data indicating one or more colors, such as an image file, a webpage script, etc.) instructing the electronic device 102 to render, among other colors, the white 116 color. In such examples, the electronic device 102 may determine, based on the data, to render the white 116 color on a portion of the RGB display, as shown. The electronic device 102 may select, based on the white 116 color, a color filter array map (e.g., the color filter array map 116A) based on the physical layout of the color filters in the display. It should be appreciated that the color filter array map 116A (e.g., comprising a pixel set representing the white 116 color) illustrates the mapping of the color filter array of the display of the electronic device 102. In some examples, a pixel set may comprise one or more pixels, for instance, a pixel set may comprise a single pixel. The color filter array map 116A, as shown, comprises alternating diagonal rows of RGB pixels. In the depicted example, in order to render the white 116 color, the electronic device 102 may select and then map the RGB values (e.g., a binary value set comprising a red binary value, a green binary value, and a blue binary value) representing the white 116 color (e.g., {1, 1, 1} or {255, 255, 255}) to a pixel set of a portion of the display (e.g., based on a location indicated by the data) using the color filter array map 116A. As shown, the electronic device 102 may activate (e.g., based on the binary value set for the white 116 color) the RGB pixels of the color filter array map 116A to produce (or render) the white 116 color on the respective portion of the display. It will be understood that the electronic device 102 may produce (or render) any or all of the binary colors (e.g., as shown from red 104 to black 118) by utilizing a respective binary value set (e.g., as described above and shown in Table A) for a respective binary color. For example, the electronic device 102 may deactivate (e.g., based on the binary value set for the black 118 color) the RGB pixels of the color filter array map 116A to produce (or render) the black 118 color on the black 118 portion of the display, as shown.

In the depicted example, the mid-gray 120 color may represent one or more gray colors. The electronic device 102 may render one or more gray colors (e.g., the mid-gray 120 color, lighter gray(s), and/or darker gray(s)) by partially activating and/or partially deactivating the red, green, and/or blue pixels on at least a portion of the display. For example, the electronic device 102 may render the mid-gray 120 color (e.g., represented by {0.5, 0.5, 0.5} or {127, 127, 127}) by activating half of the RGB pixels and deactivating half of the RGB pixels on a respective portion of the display. Table B, as shown below, provides, at least in part, a list of the gray colors (or shades of gray) and the combination of RGB pixels that represent each respective gray color.

TABLE B

| Gray Color | {R, G, B} |
|---|---|
| Light Gray | {0.75, 0.75, 0.75} or {191, 191, 191} |
| Mid-Gray | {0.5, 0.5, 0.5} or {127, 127, 127} |
| Dark Gray | {0.25, 0.25, 0.25} or {64, 64, 64} |

It will be understood that the gray colors (or shades of gray) shown in Table B are non-limiting examples for illustrative purposes and to facilitate clearer description of the example graphical scenarios. Accordingly, Table B should not be interpreted as representing a complete list of gray colors (or shades of gray) (e.g., within the RGB color model) unless specifically stated otherwise, or otherwise understood within the context of a given example.

As shown, the electronic device 102 may receive data (e.g., an e-book file, a webpage script, etc.) instructing the electronic device 102 to render, among other colors, the mid-gray 120 color. In such examples, the electronic device 102 may determine, based on the data, to render the mid-gray 120 color on a portion of the RGB display, as shown. Because gray colors cannot be produced (or rendered) by fully activating or deactivating the RGB pixels (as described above for the binary colors), the electronic device 102 may use one or more dithering techniques, as described herein, to produce (or render) the gray colors. In some examples, the electronic device 102 may select, based on an indication of the mid-gray 120 color in the received data, a Bayer matrix dithering threshold map (e.g., the Bayer matrix dithering threshold map 120A comprising a pixel set representing the mid-gray 120 color). In some examples, a pixel set may comprise one or more pixels, for instance, a pixel set may comprise a single pixel. The Bayer matrix dithering threshold map 120A, as shown, facilitates activation of a portion (e.g., half) of the alternating diagonal rows of RGB pixels. In the depicted example, in order to render the mid-gray 120 color, the electronic device 102 may select (e.g., based on an indication of the mid-gray 120 color in the received data) and then map the RGB values (e.g., a gray value set comprising a common RGB value to apply to each of the red, green, and blue pixel subsets) representing the mid-gray 120 color (e.g., {0.5, 0.5, 0.5} or {127, 127, 127}) to a pixel set of a portion of the display (e.g., based on a location indicated by the data) using the Bayer matrix dithering threshold map 120A. A Bayer matrix dithering threshold map may comprise any matrix that is a power of 2. For example, a Bayer matrix dithering threshold map may comprise at least one of a 2×2 matrix, 4×4 matrix, 8×8 matrix, and/or any other matrix that is a power of 2. In some examples, a gray value set comprises a common value (e.g., a common RGB value that is applied equally (e.g., using a Bayer matrix dithering threshold map) to the RGB pixels of a respective portion of a display). In such examples, a common value may comprise, represent, or indicate a pixel activation value that may be greater than 0% (e.g., an integer value of 0 in the 8-bit RGB color space) and less than 100% (e.g., an integer value of 255 in the 8-bit RGB color space). As shown, the electronic device 102 may activate (e.g., based on the binary value set for the mid-gray 120 color and the Bayer matrix dithering threshold map 120A) a portion of the RGB pixels (e.g., half of the RGB pixels may be fully activated and half of the RGB pixels may be fully deactivated) to produce (or render) the mid-gray 120 color on the respective portion of the display. As depicted by the Bayer matrix dithering threshold map 120A, every other row of a respective color (red, green, or blue) is activated (or deactivated) resulting in half of the RGB pixel being activated (or deactivated) (e.g., in the mid-gray 120 portion of the display of the electronic device 102). It should be appreciated that, as shown, the Bayer matrix dithering threshold map 120A (e.g., representing the mid-gray 120 color) all three RGB channels are set to a level of 0.5, translating to half of the pixels in each channel being set to a level of 1 and half being set to a level of 0. In addition, the arrangement depicted by the Bayer matrix dithering threshold map 120A produces (or renders) a more uniform representation of the mid-gray 120 color because the high contrast pattern (e.g., activated vs deactivated pixels) is uniformly scattered (or distributed). In some examples, a gray color may have a saturation measure equal to 0% (or any other value). It should be appreciated that, in some examples, a gray color may be produced by lowering the saturation measure and altering one or more of the RGB color values to render a color perceivable by a user as gray on a display while maintaining a non-zero saturation value.

It will be understood that the electronic device 102 may produce (or render) any or all gray colors (e.g., of the RGB color model) by utilizing a respective gray value set (e.g., as described above and shown in Table B) for a respective gray color and by utilizing, at least in part, the Bayer matrix dithering threshold map 120A (and/or variable gray levels) as described herein.

In the depicted example, the rose 122 color and the orange 124 color may represent tertiary colors (e.g., tertiary RGB colors). It will be understood that other tertiary colors and/or higher order colors (e.g., within the RGB color model) may be produced (or rendered) using operations similar to those described herein for producing (or rendering) the orange 124 color. The electronic device 102 may render one or more tertiary (or higher order) colors (e.g., rose 122, orange 124, violet, azure, spring green, chartreuse-green, etc.) by partially activating and/or partially deactivating the red, green, and/or blue pixels on at least a portion of the display. For example, the electronic device 102 may render the orange 124 color (e.g., represented by {1, 0.5, 0} or {255, 127, 0}) by activating the red pixels, activating half of the green pixels, and deactivating the blue pixels on a respective portion of the display. Table C, as shown below, provides, at least in part, a list of the tertiary colors and the combination of RGB pixels that represent each tertiary color.

TABLE C

| Tertiary Color | {R, G, B} |
|---|---|
| Rose | {1, 0, 0.5} or {255, 0, 127} |
| Violet | {0.5, 0, 1} or { 127, 0, 255} |
| Azure | {0, 0.5, 1} or {0, 127, 255} |
| Spring Green | {0, 1, 0.5} or {0, 255, 127} |
| Chartreuse-Green | {0.5, 1, 0} or {127, 255, 0} |
| Orange | {1, 0.5, 0} or {255, 127, 0} |

It will be understood that the tertiary colors shown in Table C are non-limiting examples for illustrative purposes and to facilitate clearer description of the example graphical scenarios. Accordingly, Table C should not be interpreted as representing a complete list of higher order colors (e.g., within the RGB color model) unless specifically stated otherwise, or otherwise understood within the context of a given example.

As shown, the electronic device 102 may receive data (e.g., a video frame, an e-magazine, a graphical user interface, etc.) instructing the electronic device 102 to render, among other colors, the orange 124 color. In such examples, the electronic device 102 may determine, based on the data, to render the orange 124 color on a portion of the RGB display, as shown. Because tertiary (or higher order) colors cannot be produced (or rendered), at least in part, by fully activating or deactivating the RGB pixels (as described above for the binary colors), the electronic device 102 may use one or more dithering techniques, as described herein, to produce (or render), at least in part, the tertiary (or higher order) colors. In some examples, the electronic device 102 may select, based on an indication of the orange 124 color in the received data, an alternating dithering threshold map (e.g., the alternating dithering threshold map 300 as described below in connection with FIG. 3) indicating a pattern of alternating threshold values to activate based on the respective RGB values of a respective tertiary color value set. An alternating dithering threshold map (e.g., the alternating dithering threshold map 300 and/or the like as described herein) may comprise a matrix divisible by 3. For example, an alternating dithering threshold map may comprise at least one of a 3×3 matrix, 9×9 matrix, and/or any other matrix divisible by 3. In some examples, the alternating dithering threshold map (e.g., the alternating dithering threshold map 300 and/or the like as described herein) may comprise a matrix divisible by 3 and a power of 2 (i.e., 2"). For example, an alternating dithering threshold map may comprise at least one of a 6×6 matrix, 12×12 matrix, and/or any other matrix divisible by 3 and a power of 2.

In some examples, the electronic device 102 may select, based on an indication of the orange 124 color in the received data, a tertiary color value set comprising a red value, a green value, and a blue value (e.g., the tertiary color value set for orange, as shown in Table C, being {1, 0.5, 0} or {255, 127, 0}). In addition, the electronic device 102 may map the RGB values (e.g., of a tertiary color value set) representing the orange 124 color to a pixel set of a portion of the display (e.g., based on a location indicated by the data) using the alternating dithering threshold map. In some examples, a pixel set may comprise one or more pixels, for instance, a pixel set may comprise a single pixel. As shown, the electronic device 102 may activate (e.g., based on the tertiary value set for the orange 124 color and the alternating dithering threshold map) a portion of the RGB pixels (e.g., as depicted by the activated/deactivated pixels in the alternating dithering threshold map 124A comprising a pixel set (e.g., the pixel set 502 described below in connection with FIG. 5) representing the orange 124 color) to produce (or render) the orange 124 color on the respective portion of the display. As depicted by the alternating dithering threshold map 124A, the diagonal rows of red pixels are fully activated, the diagonal rows of green pixels are partially activated (e.g., half of the green pixels are activated/deactivated), and the diagonal rows of blue pixels are fully deactivated causing rendering of the orange 124 color on the orange 124 portion of the display of the electronic device 102. It should be appreciated that, in the alternating dithering threshold map 124A, the green pixels in the diagonal rows of green pixels alternate between being activated and deactivated as will be described in further detail below in connection with FIG. 2.

It will be understood that the electronic device 102 may produce (or render) any or all tertiary (or higher order) colors (e.g., of the RGB color model) by utilizing a respective value set (e.g., as described above and shown in Table C) for a respective tertiary (or higher order) color and by utilizing, at least in part, the Bayer matrix dithering threshold map, an alternating dithering threshold map, a color filter array map, and/or the like as described herein.

Now that an example system for using multiple threshold maps for color dithering has been described above with reference to FIG. 1, an example system utilizing multiple threshold maps to produce an example orange color will now be described below with reference to FIG. 2.

FIG. 2 illustrates an example system utilizing multiple threshold maps to produce an example orange color, in accordance with various aspects of the present disclosure. As shown, the system 200 may comprise, at least in part, the system 100 as described above in connection with FIG. 1. The system 200, as shown, may comprise the electronic device 202 configured with control logic (e.g., as described below in connection with FIG. 7) to utilize multiple threshold maps for color dithering in order to produce (or render) at least one color (e.g., orange) with at least one texture appearance. In some examples, the electronic device 202 may comprise, at least in part, one or more of the electronic device 102 (as described above in connection with FIG. 1), the electronic device 402 (as described below in connection with FIG. 4), and/or the electronic device 600 (as described below in connection with FIG. 6).

Figure 3:
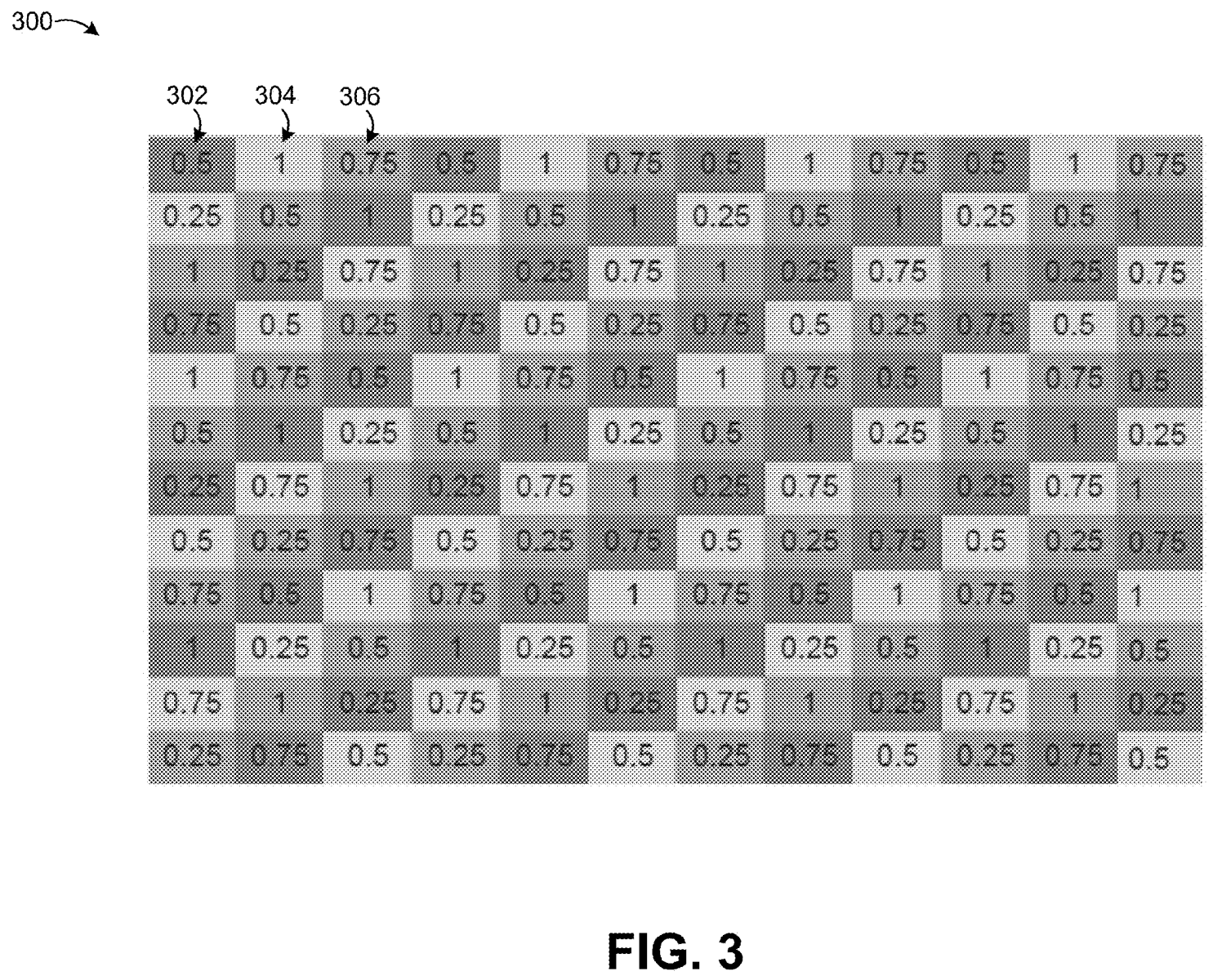

In the depicted example, the electronic device 202 is illustrated in two states including a first state 202A and a second state 202B as described below. In the first state 202A, the electronic device 202 is configured (e.g., by control logic, etc.) to produce (or render) an orange 204 color with a fine texture 204A appearance. In some such examples, the electronic device 202 may receive data indicating the orange 204 color and the fine texture 204A appearance. For example, the user 208 may select a pen color (e.g., orange, etc.) and a texture type (e.g., fine texture, reduced texture, etc.) for use with a stylus pen in order to draw or write on the display of the electronic device 202. The electronic device 202 may select a tertiary color value set representative of the orange 204 color and select, based on the selected texture type, an alternating dithering threshold map configured to produce (or render) the selected texture type. For example, the electronic device 202 may utilize a lookup table (or the like) to determine that in order to produce (or render) the fine texture 204A appearance with the orange 204 color, the electronic device 202 may utilize an alternating dithering threshold map (e.g., the alternating dithering threshold map 300 as shown in FIG. 3 and/or the like as described herein) with the tertiary color value set representative of the orange 204 color. As shown, the electronic device 202 produces (or renders) the orange 204 color with the fine texture 204A appearance by activating/deactivating the RGB pixels based on the alternating dithering threshold map 204B (e.g., comprising a pixel set (e.g., the pixel set 502 described below in connection with FIG. 5) representing the orange 204 color and the fine texture 204A appearance). In some examples, the alternating dithering threshold map 204B may be the same as, or similar to, the alternating dithering threshold map 124A described above in connection with FIG. 1.

In the second state 202B, the electronic device 202 is configured (e.g., by control logic, etc.) to produce (or render) an orange 206 color with a coarse texture 206A appearance. It should be appreciated that the orange 206 color may be the orange 204 color with a different texture appearance. In the second state 202B, the electronic device 202 may receive data indicating the orange 206 color and the coarse texture 206A appearance. For example, the user 208 may select a pen color (e.g., orange, etc.) and a texture type (e.g., coarse texture, etc.) for use with a stylus pen in order to draw or write on the display of the electronic device 202. The electronic device 202 may select a tertiary color value set representative of the orange 206 color. It should be appreciated that, in some examples, a single tertiary color value set may be representative of the orange 204 color and the orange 206 color. The electronic device 202 may select, based on the selected texture type, a Bayer matrix dithering threshold map configured to produce (or render) the selected texture type. For example, the electronic device 202 may utilize a lookup table (or the like) to determine that in order to produce (or render) the coarse texture 206A appearance with the orange 206 color, the electronic device 202 may utilize a Bayer matrix dithering threshold map (e.g., the Bayer matrix dithering threshold map 120A as shown in FIG. 1 and/or the like as described herein) with the tertiary color value set representative of the orange 206 color. As shown, the electronic device 202 produces (or renders) the orange 206 color with the coarse texture 206A appearance by activating/deactivating the RGB pixels based on the Bayer matrix dithering threshold map 206B (e.g., comprising a pixel set representing the orange 206 color and the coarse texture 206A appearance). In some examples, the orange 204 color and/or the orange 206 color may be the same as, or similar to, the orange 124 color described above in connection with FIG. 1. In some examples, the Bayer matrix dithering threshold map 206B may be the same as, or similar to, the Bayer matrix dithering threshold map 120A described above in connection with FIG. 1.

It will be understood that, as shown, in the alternating dithering threshold map 204B half of the green pixels are activated in each of the diagonal rows of green pixels resulting in smaller groups of black pixels (e.g., than in the Bayer matrix dithering threshold map 206B) which may, at least in part, result in the fine texture 204A appearance. In addition, as shown, in the Bayer matrix dithering threshold map 206B half of the diagonal rows of green pixels are activated and half of the diagonal rows of green pixels are deactivated. It should be appreciated that in the Bayer matrix dithering threshold map 206B the diagonal rows of deactivated green pixels adjacent the diagonal rows of deactivated blue pixels result in larger groups of black pixels (e.g., than in the alternating dithering threshold map 204B) which may, at least in part, result in the coarse texture 206A appearance.

Now that an example system utilizing multiple threshold maps to produce an example orange color has been described above with reference to FIG. 2, an example alternating dithering threshold map will now be described below with reference to FIG. 3.

FIG. 3 illustrates an example alternating dithering threshold map, in accordance with various aspects of the present disclosure. As shown, the alternating dithering threshold map 300 may comprise a plurality of threshold activation values comprising a respective threshold activation value for each respective pixel. In the depicted example, a respective threshold activation value may be 0.25, 0.5, 0.75, or 1. For example, the blue pixel 302 has a threshold activation value of 0.5, the green pixel 304 has a threshold activation value of 1, and the red pixel 306 has a threshold activation value of 0.75. In some examples, a respective threshold activation value for a respective pixel may comprise any value between 0 and 1, for instance, a respective threshold activation value may be 0.1, 0.2, 0.3, 0.4, 0.5, 0.6, 0.7, 0.8, 0.9, 1 or any other number. As shown, in the depicted example, the threshold activation values alternate within a respective diagonal row of pixels (e.g., a diagonal row of red, green, or blue pixels) in a pattern (e.g., from the bottom left to the top right of 1, 0.5, 0.75, and 0.25). In other examples, the alternating dithering threshold map 300 (or the like) may be configured with other patterns of threshold activation values.

In some examples, an electronic device (e.g., electronic device 102, etc.) may use the alternating dithering threshold map 300 with a respective color value set in order to produce (or render) a respective color on a display (e.g., the mid-gray 404 color as described below in connection with FIG. 4). For instance, an electronic device may receive an input (e.g., data, instructions, etc.) to render the color orange (e.g., the orange 124 color as described above in connection with FIG. 1, the orange 204 as described above in connection with FIG. 2) on a display. In such examples, the electronic device may map the plurality of threshold activation values of the alternating dithering threshold map 300 to the pixels of at least a portion of the display. In addition, the electronic device may activate any or all pixels that have (e.g., are assigned, associated with, etc.) a threshold activation value equal to, or less than, a respective value of the color value set (e.g., the tertiary color value set for orange, such as {1, 0.5, 0} or {255, 127, 0}.

For instance, in the orange color value set the red value is equal to 1 and, in such examples, all of the red pixels (e.g., the red pixel 306, etc.) would be activated because all of red pixels have a threshold activation value equal to, or less than, 1, as shown in the alternating dithering threshold map 300. In addition, in the orange color value set the green value is equal to 0.5 and, in such examples, half of the green pixels (e.g., the green pixel 304, etc.) would be deactivated because half of the green pixels have a threshold activation value greater than 0.5, as shown in the alternating dithering threshold map 300. For example, the green pixels with a threshold activation of 0.75 and 1 would be deactivated and the green pixels with a threshold activation of 0.25 and 0.5 would be activated. Moreover, in the orange color value set the blue value is equal to 0 and, in such examples, all of the blue pixels (e.g., the blue pixel 302, etc.) would be deactivated because all of the blue pixels have a threshold activation value greater than 0, as shown in the alternating dithering threshold map 300. As shown, the alternating dithering threshold map 300 (and/or the like as described herein) may comprise at least one matrix divisible by 3 as described herein.

Now that an example tertiary color dithering threshold map has been described above with reference to FIG. 3, an example system utilizing multiple threshold maps to produce an example mid-gray color will now be described below with reference to FIG. 4.

Figure 4:
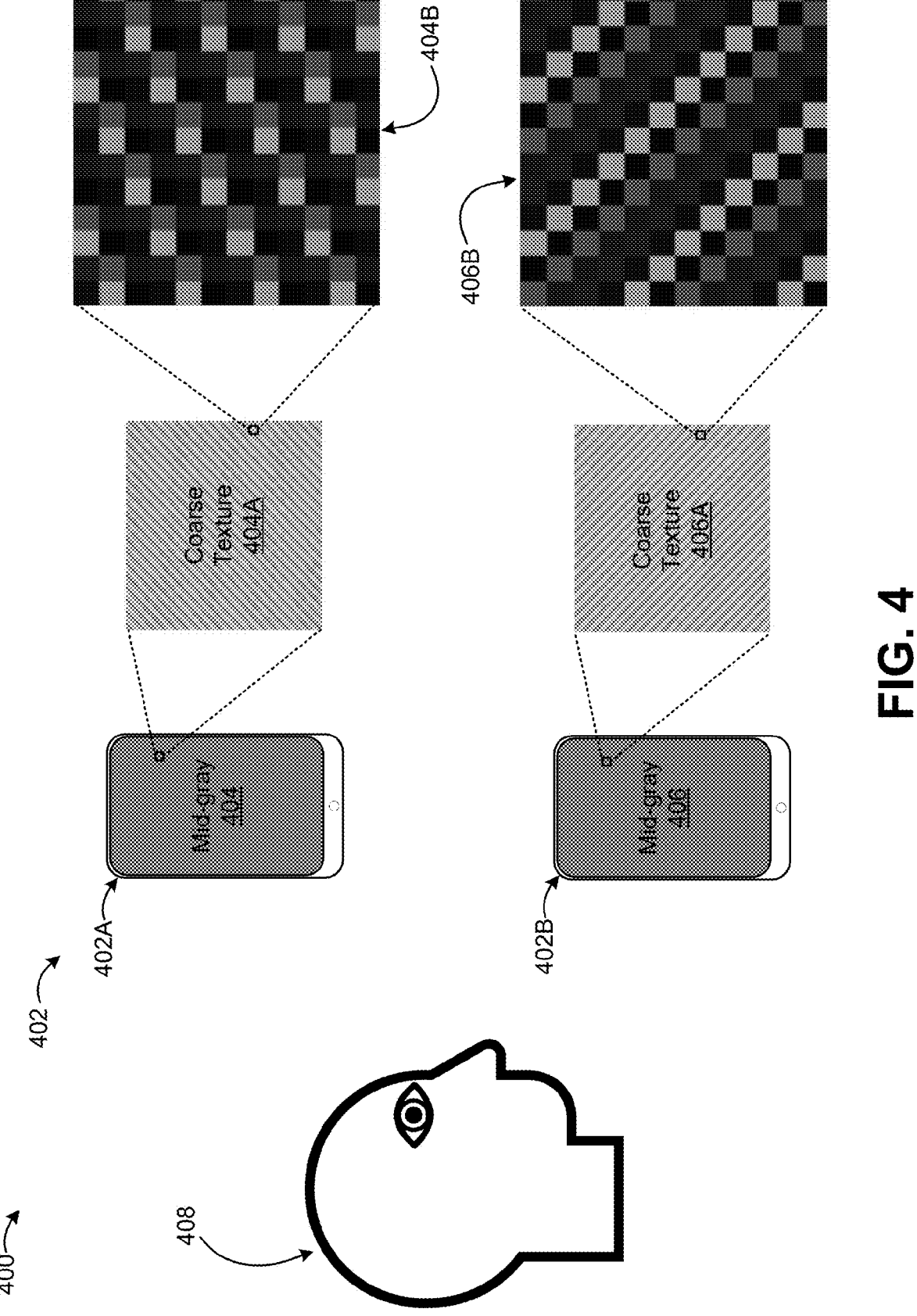
FIG. 4 illustrates an example system utilizing multiple threshold maps to produce an example mid-gray color, in accordance with various aspects of the present disclosure.

FIG. 4 illustrates an example system utilizing multiple threshold maps to produce an example mid-gray color, in accordance with various aspects of the present disclosure. As shown, the system 400 may comprise, at least in part, the system 100 as described above in connection with FIG. 1 and/or the system 200 as described above in connection with FIG. 2. The system 400, as shown, may comprise the electronic device 402 configured with control logic (e.g., as described below in connection with FIG. 7) to utilize multiple threshold maps for color dithering in order to produce (or render) at least one color (e.g., mid-gray) with at least one texture appearance. In some examples, the electronic device 402 may comprise, at least in part, one or more of the electronic device 102 (as described above in connection with FIG. 1), the electronic device 202 (as described above in connection with FIG. 2), and/or the electronic device 600 (as described below in connection with FIG. 6).

In the depicted example, the electronic device 202 is illustrated in two states including a first state 402A and a second state 402B as described below. In the first state 402A, the electronic device 402 is configured (e.g., by control logic, etc.) to produce (or render) a mid-gray 404 color with a first coarse texture 404A appearance. In some such examples, the electronic device 402 may receive data indicating the mid-gray 404 color and the first coarse texture 404A appearance. For example, the user 408 may select a font color (e.g., mid-gray, etc.) and a texture type (e.g., the first coarse texture 404A, etc.) for use with a word processor in order to take notes on the electronic device 402. The electronic device 402 may select a gray value set representative of the mid-gray 404 color and select, based on the selected texture type, an alternating dithering threshold map configured to produce (or render) the selected texture type. For example, the electronic device 402 may utilize a lookup table (or the like) to determine that in order to produce (or render) the first coarse texture 404A appearance with the mid-gray 404 color, the electronic device 402 may utilize an alternating dithering threshold map (e.g., the alternating dithering threshold map 300 as shown in FIG. 3 and/or the like as described herein) with the gray value set representative of the mid-gray 404 color. As shown, the electronic device 402 produces (or renders) the mid-gray 404 color with the first coarse texture 404A appearance by activating/deactivating the RGB pixels based on the alternating dithering threshold map 404B (e.g., comprising a pixel set representing the mid-gray 404 color and the first coarse texture 404A appearance). In some examples, the alternating dithering threshold map 404B may be the same as, or similar to, the alternating dithering threshold map 300 described above in connection with FIG. 3.

In the second state 402B, the electronic device 402 is configured (e.g., by control logic, etc.) to produce (or render) a mid-gray 406 color with a second coarse texture 406A appearance. It should be appreciated that the mid-gray 406 color may be the mid-gray 404 color with a different texture appearance. In the second state 402B, the electronic device 402 may receive data indicating the mid-gray 406 color and the second coarse texture 406A appearance. For example, the user 408 may select a font color (e.g., mid-gray, etc.) and a texture type (e.g., the second coarse texture 406A, etc.) for use with a word processor in order to take notes on the electronic device 402. The electronic device 402 may select a gray value set representative of the mid-gray 406 color. It should be appreciated that, in some examples, a single gray value set may be representative of the mid-gray 404 color and the mid-gray 406 color. The electronic device 402 may select, based on the selected texture type, a Bayer matrix dithering threshold map configured to produce (or render) the selected texture type. For example, the electronic device 402 may utilize a lookup table (or the like) to determine that in order to produce (or render) the second coarse texture 406A appearance with the mid-gray 406 color, the electronic device 402 may utilize a Bayer matrix dithering threshold map (e.g., the Bayer matrix dithering threshold map 120A as shown in FIG. 1 and/or the like as described herein) with the gray value set representative of the mid-gray 406 color. As shown, the electronic device 402 produces (or renders) the mid-gray 406 color with the second coarse texture 406A appearance by activating/deactivating the RGB pixels based on the Bayer matrix dithering threshold map 406B (e.g., comprising a pixel set representing the mid-gray 406 color and the second coarse texture 406A appearance). In some examples, the mid-gray 404 color and/or the mid-gray 406 color may be the same as, or similar to, the mid-gray 120 color described above in connection with FIG. 1. In some examples, the Bayer matrix dithering threshold map 406B may be the same as, or similar to, the Bayer matrix dithering threshold map 120A described above in connection with FIG. 1.

It will be understood that, as shown, in the alternating dithering threshold map 404B half of the pixels are activated in each of the diagonal rows of pixels resulting in groups of black pixels which may, at least in part, result in the first coarse texture 404A appearance. In addition, as shown, in the Bayer matrix dithering threshold map 406B half of the diagonal rows of pixels are activated and half of the diagonal rows of pixels are deactivated. It should be appreciated that in the Bayer matrix dithering threshold map 406B the diagonal rows of deactivated pixels alternate with the diagonal rows of activated pixels which may, at least in part, result in the second coarse texture 406A appearance. It should be appreciated that, in some examples, because the black pixels are more evenly disbursed in the Bayer matrix dithering threshold map 406B than in the alternating dithering threshold map 404B, the second coarse texture 406A may have a reduced texture appearance than the first coarse texture 404A. As shown, the alternating dithering threshold map 404B (and/or the like as described herein) may comprise at least one matrix divisible by 3.

Now that an example system utilizing multiple threshold maps to produce an example mid-gray color has been described above with reference to FIG. 4, example pixel sets utilizing dithering threshold maps will now be described below with reference to FIG. 5.

Figure 5:
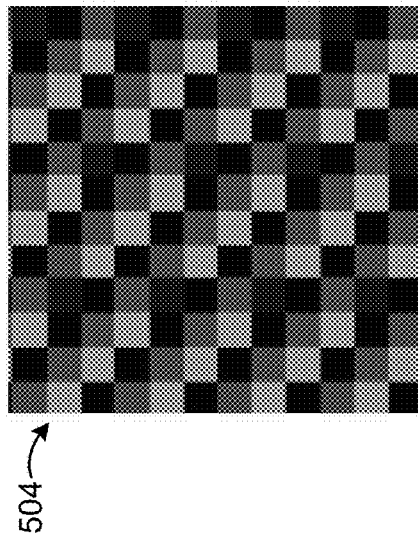
FIG. 5 illustrates example pixel sets utilizing dithering threshold maps, in accordance with various aspects of the present disclosure.
Figure 5:
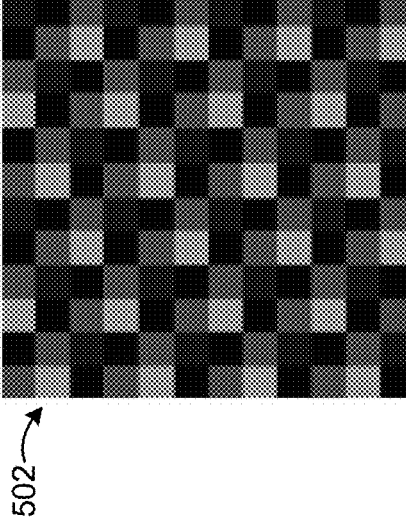

FIG. 5 illustrates example pixel sets utilizing dithering threshold maps, in accordance with various aspects of the present disclosure. As shown, the plurality of pixel sets 500 comprises a pixel set 502 and a pixel set 504. In some examples, an electronic device may be configured with one or more of a dithering threshold map (e.g., the alternating dithering threshold map 124A, the alternating dithering threshold map 300, the Bayer matrix dithering threshold map 120A, and/or the like) in order to produce at least one of the plurality of pixel sets 500.

The pixel set 502, as shown, may be configured using an alternating dithering threshold map (e.g., the alternating dithering threshold map 124A, the alternating dithering threshold map 204B, or the like described herein) in order to represent an orange color (e.g., {1, 0.5, 0}, orange 124, orange 204, or the like as described herein). In the depicted example, the pixel set 502 may utilize an alternating dithering threshold map. As shown, all of the red pixels are fully activated with 100% brightness (or intensity), half of the green pixels are fully activated with 100% brightness (or intensity), half of the green pixels are fully deactivated with 0% brightness (or intensity), and all of the blue pixels are fully deactivated with 0% brightness (or intensity). It should be appreciated that in the pixel set 502 a respective pixel is either fully activated or fully deactivated. In such examples, the electronic device may support two gray levels (e.g., intensity values, brightness levels, etc.) such as {Off=0, On=1}. As shown, the alternating dithering threshold map 204B (and/or the like as described herein) may comprise at least one matrix divisible by 3.

The pixel set 504, as shown, may be configured using an alternating dithering threshold map (e.g., the alternating dithering threshold map 300, or the like as described herein) in order to represent an amber or a golden yellow color (e.g., {1, 0.75, 0}). In the depicted example, the pixel set 504 may utilize an alternating dithering threshold map. As shown, all of the red pixels are fully activated with 100% brightness (or intensity), 75% of the green pixels are fully activated with 100% brightness (or intensity), 25% of the green pixels are fully deactivated with 0% brightness (or intensity), and all of the blue pixels are fully deactivated with 0% brightness (or intensity). It should be appreciated that in the pixel set 504 a respective pixel is either fully activated or fully deactivated. In such examples, the electronic device may support two gray levels (e.g., intensity values, brightness levels, etc.) such as {Off=0, On=1}.

Now that various example systems and dithering threshold maps have been described above, a block diagram for an example electronic device will now be described below with reference to FIG. 6.

Figure 6:
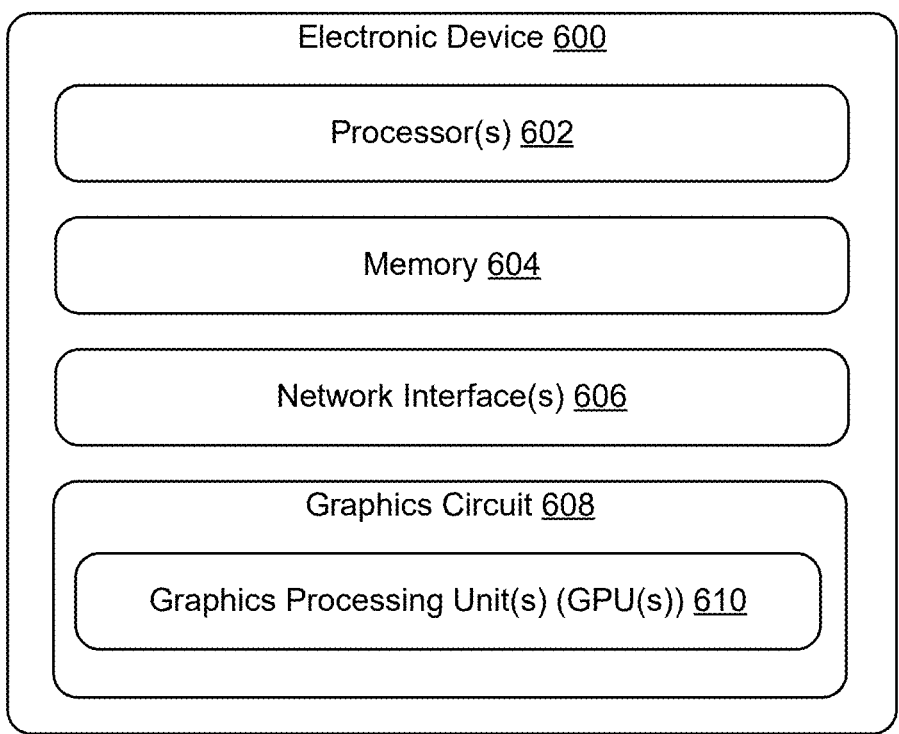
FIG. 6 illustrates a block diagram for an example electronic device, in accordance with various aspects of the present disclosure.

FIG. 6 illustrates a block diagram for an example electronic device, in accordance with various aspects of the present disclosure. The electronic device 600, as shown, comprises the processor(s) 602, memory 604, network interface(s) 606, and graphics circuit 608. The graphics circuit 608 (e.g., graphics chip, SoC, integrated circuit, graphics card, etc.), as shown, may comprise at least one Graphics Processing Unit (GPU), such as GPU(s) 610. In some examples, the graphics circuit 608 may further comprise dedicated memory and/or may leverage the memory 604. In some examples, the GPU(s) 610 (and/or the like) may comprise one or more features and/or aspects (e.g., multiple processors, multiple cores, cores of different types, etc.) described herein for the processor(s) 602. For example, the graphics circuit 608 may have a dedicated processor (e.g., GPU(s) 610) and/or may further leverage the processor(s) 602 (e.g., CPU(s)). The processor(s) 602 may perform various functions associated with controlling an operation of the electronic device 600, and the memory 604 may store instructions executable by the processor(s) 602 to perform any operations described herein.

As used herein, a processor or CPU, such as the processor(s) 602, may include multiple processors and/or a processor having multiple cores. Further, the processor(s) 602 may comprise one or more cores of different types. For example, the processor(s) 602 may include application processor units, graphic processing units, and so forth. In one implementation, the processor(s) 602 may comprise a microcontroller and/or a microprocessor. The processor(s) 602 may include a microprocessor, a digital signal processor or other processing units or components known in the art. Alternatively, or in addition, the functionality described herein can be performed, at least in part, by one or more hardware logic components. For example, and without limitation, illustrative types of hardware logic components that may be used include Field-Programmable Gate Arrays (FPGAs), Application-Specific Integrated Circuits (ASICs), Application-Specific Standard Products (ASSPs), System on a Chip (SoC), Complex Programmable Logic Devices (CPLDs), and/or the like. Additionally, each of the processor(s) 602 may possess its own local memory, which also may store at least one of program components, program data, program code, program.

Memory, such as the memory 604, may include one or more of volatile memory, nonvolatile memory, removable media, non-removable media, and/or the like implemented in any method or technology for storage of information, such as computer-readable instructions, data structures, program components, firmware, software, and/or any other data. The memory 604 may include, but is not limited to, one or more of Random Access Memory (RAM), Read-Only Memory (ROM), Electrically Erasable Programmable Read-Only Memory (EEPROM), flash memory or other memory technology, CD-ROM, digital versatile disks (DVD) or other optical storage, magnetic cassettes, magnetic tape, magnetic disk storage or other magnetic storage devices, Redundant Array of Independent Disks (RAID) storage systems, and/or any other medium which can be used to store the desired information and which can be accessed by a computing device. The memory 604 may be implemented as Computer-Readable Storage Media (CRSM), which may comprise any available physical media accessible by the processor(s) 602 to execute instructions stored on the memory. In some examples, a CRSM may include RAM and flash memory (e.g., NAND flash, NOR flash, etc.). In other implementations, CRSM may include, but is not limited to, ROM, EEPROM, or any other tangible medium which can be used to store the desired information, and which can be accessed by the processor(s). The memory 604 may be one or more examples of non-transitory computer-readable media. The memory 604 may store an Operating System (OS) and one or more software applications, instructions, programs, and/or data to implement the methods described herein and the functions attributed to the various systems. For example, the memory 604 may comprise one or more databases, data tables, datasets, and/or the like as described herein. In some examples, the memory 604 may comprise at least one non-transitory computer-readable memories (or the like as described herein).

Network interface(s) 606 permit the electronic device 600 to communicate over one or more networks. For example, the network interface(s) 606 may permit the electronic device 600 to communicate over one or more communications networks (e.g., the Internet, an intranet, a mobile network, and/or the like). In some examples, a communications network may comprise one or more communications channels, tunnels, Virtual Private Networks (VPNs), and/or the like. In some examples, a communications network may be implemented using encryption techniques (e.g., end to end encryption, etc.). Example network interface(s) 606 include, without limitation, a Wi-Fi circuit (e.g., Dual-band 802.11 a/b/g/n/ac/ax 2×2 MIMO dual-antenna, Tri-band 802.11 a/b/g/n/ac/ax 2×2 MIMO dual-antenna, etc.), ZigBee circuit, Bluetooth circuit (e.g., Bluetooth 5.2, Bluetooth Low Energy (BLE), etc.), LTE circuit, and/or any other communications protocol, hardware, software, and/or firmware. The network interface(s) 606 permit communication with remote device(s), such as mobile devices (e.g., phones, remote controls, microphones, etc.), systems (e.g., cloud services, remote servers, etc.), and/or the like. The network(s) may be representative of any type of communication network, including data and/or voice network, and may be implemented using wired infrastructure (e.g., cable, CAT5, fiber optic cable, etc.), a wireless infrastructure (e.g., radio frequency, cellular, microwave, satellite, Bluetooth, etc.), and/or other connection technologies.

In some instances, inbound data may be routed through the network interface(s) 606 before being directed to the processor(s) 602 and/or GPU(s) 610, and outbound data from the processor(s) 602 and/or GPU(s) 610 may be routed through the network interface(s) 606. The network interface(s) 606 may therefore receive inputs, such as data, from the processor(s) 602, the GPU(s) 610, and/or any other component described herein. For example, the network interface(s) 606 may be configured to transmit data to and/or receive data from one or more network devices (e.g., Wi-Fi routers, etc.). The network interface(s) 606 may act as a conduit for data communicated between various components and the processor(s) 602 and/or the like.

Although certain components of the electronic device 600 are illustrated, it is to be understood that the electronic device 600 may include additional and/or alternative components. For example, the electronic device 600 may include other input/output devices (e.g., haptic motors, speakers, light sources, etc.), heat dissipating elements (e.g., heatsinks, fans, vents, etc.), computing components (e.g., Printed Circuit Boards (PCBs), and/or the like. In some examples, one or more components illustrated for the electronic device 600 may be removed or omitted. In some examples, one or more components described herein may be added to or incorporated with electronic device 600. Examples of the electronic device 600 may include, without limitation, a server, a desktop computer, a laptop computer, an e-reader, a smartphone, a tablet computer, a wearable device (e.g., smartwatch, etc.), a computer monitor (e.g., a screen, a display, etc.), a television, and/or the like as described herein. For example, an electronic device may comprise a display assembly comprising one or more of first color components having a first color and a first charge polarity, second color components having a second color different from the first color, a thin film transistor assembly, and a color filter array assembly. Various example systems and processes described herein may include, or be implemented using, or in conjunction with, or for, a device or electronic device as described herein.

Now that a block diagram for an example electronic device has been described above with reference to FIG. 6, an example flowchart for utilizing different threshold maps to render different colors, will now be described below with reference to FIG. 7.

FIG. 7 illustrates an example flowchart representing control logic for utilizing different threshold maps to render different colors. As shown, the process 700 may represent control logic to facilitate utilizing different maps (e.g., dithering threshold maps, color filter (or color filter array) maps, etc.) to render one or more different colors (e.g., primary colors, secondary colors, tertiary colors, shades of gray, and/or the like) from Red Green Blue (RGB) color filters of an RGB display. The operations of the process 700 may represent control logic embodied as a series of instructions comprising computer readable machine code executable by a processing unit (e.g., processor(s) 602) of one or more computing devices described herein (e.g., electronic device 600, an e-reader, a tablet, etc.), although various operations may also be implemented in, or using, hardware (e.g., a System on a Chip (SoC), a screen including a front light, an RGB color filter array panel, a monochrome electrophoretic display panel, a thin-film transistor backplane, and/or the like). In some examples, the computer readable machine codes may be comprised of instructions selected from a native instruction set of at least one processor and/or an Operating System (OS) of an electronic device. In some examples, the process 700 may be performed, at least in part, by one or more components of electronic device 600 and/or the like as described herein.

As shown in FIG. 7, the process 700 may begin at operation 702, at which the electronic device 600 (or the like as described herein) may detect data representing a color and a location on a display. For example, the detected data may comprise pixel color data which may indicate (and/or represent) a set of color channel values corresponding to one or more colors (e.g., gray, binary, secondary, tertiary, orange, magenta, etc.) as described herein. As shown in FIG. 7, the operation 702 may be performed iteratively, such as to detect a plurality of colors associated with a color image, graphical user interface, and/or the like. In some examples, the operation 702 may comprise receiving (e.g., by network interface(s) 606, etc.) data (e.g., a data packet, a file, etc.), such as image data, video data, graphical user interface data (e.g., for an application, a webpage, etc.), and/or any other data described herein for, at least in part, rendering on a display. In some examples, the operation 702 may comprise scanning, at least in part, data comprising instructions to render images, colors, and/or the like on at least a portion of a display of the electronic device 600. For example, if a user provides an input to render data (e.g., an image file, a video file, a webpage, an application, and/or the like) on the electronic device 600 then the electronic device 600 may scan and/or read the data to determine how to render the data on a display. In some examples, the electronic device 600 may detect data indicating one or more colors to be rendered at one or more locations of the display. For example, the electronic device 600 may scan, at least in part, a portion of a display (e.g., during refreshing operations, opening an image file, rendering a graphical user interface, etc.) in order to detect a color associated with the portion of the display. In some examples, a portion of the display may be associated with screen coordinates, pixel coordinates, and/or any other data representing a location on the display. For example, image data (or the like) may comprise instructions to render one or more of: (i) a binary color (e.g., red, green, blue, yellow, black, white, etc.) on a respective portion of a display (e.g., identified using pixel coordinates, etc.); (ii) a gray color (e.g., light gray, mid-gray, dark gray, etc.) on a respective portion of the display (e.g., identified using pixel coordinates, etc.); and/or (iii) a tertiary color (e.g., a tertiary RGB color, orange, rose, violet, azure, spring green, chartreuse-green, etc.) on a respective portion of the display (e.g., identified using pixel coordinates, etc.).

The process 700 may continue at operation 704, at which the electronic device 600 (or the like as described herein) may determine whether the data (e.g., as described above at the operation 702) comprises, represents, and/or indicates a gray color (e.g., a shade of gray). In some examples, a gray color may comprise any shade of gray between the color black (e.g., $\{0, 0, 0\}$) and the color white (e.g., $\{1, 1, 1\}$) in the RGB color space. In some such examples, the red value, the green value, and the blue value of a gray color may be equal. For example, a mid-gray color may be defined by a gray value set of $\{0.5, 0.5, 0.5\}$, a dark gray color may be defined by a gray value set of $\{0.25, 0.25, 0.25\}$, and a light gray may be defined by a gray value set of $\{0.75, 0.75, 0.75\}$. In some examples, a gray color may have a saturation measure equal to 0%. In some examples, the operation 704 may comprise determining (e.g., based on data described above at the operation 702) a gray color to render, at least in part, on a respective portion of a display (e.g., an RGB display). In some examples, if the electronic device 600 determines that at least a portion of the data does comprise, represent, and/or indicate a gray color then the process 700 may proceed to the operation 706 as described below (e.g., utilizing, at least in part, that respective portion of the data). In some examples, if the electronic device 600 determines that at least a portion of the data does not comprise, represent, and/or indicate, at least in part, a binary color then the process 700 may proceed to the operation 712 as described below (e.g., utilizing, at least in part, that respective portion of the data).

The process 700 may continue at operation 706, at which the electronic device 600 (or the like as described herein) may select a gray value set representing a gray color. In some examples, the operation 706 may comprise selecting (e.g., based, at least in part, on an indication of the gray color in the received data) a gray value set comprising a common value (e.g., a common RGB value that is applied equally to the RGB pixels of a respective portion of a display). In some examples, a common value may comprise, represent, or indicate a pixel activation value that may be greater than 0% (e.g., an integer value of 0 in the 8-bit RGB color space) and less than 100% (e.g., an integer value of 255 in the 8-bit RGB color space). In some examples, the common value may be applied to a red pixel subset, a green pixel subset, and a blue pixel subset of a respective pixel set (e.g., in order to cause rendering of a gray color). In some examples, the gray value set may cause rendering of the gray color when mapped to a respective pixel set of the respective portion of the RGB display. For example, if the electronic device 600 determines that the gray color is mid-gray then the electronic device 600 may select (e.g., from a lookup table, a database, etc.) a respective gray value set of $\{0.5, 0.5, 0.5\}$ to apply to the respective pixel set of the respective portion of the display. The respective pixel set may comprise one or more pixels. In some examples, the operation 706 may comprise determining to use the first dither map for a first pixel location based on first pixel color data for the first pixel location that indicates a set of color channel values for the first pixel location. In some examples, the operation 706 may comprise determining, based on the first pixel color data and the first dither map, first dithered pixel color data for the first pixel location. In some such examples, determining to use the first dither map for the first pixel location may be based on first color filter array data indicating a color channel associated with the first pixel location. In some examples, the first dithered pixel color data is determined based on first color filter array data indicating a color channel associated with the first pixel location.

The process 700 may continue at operation 708, at which the electronic device 600 (or the like as described herein) may select a Bayer matrix dithering threshold map. In some examples, the operation 708 may comprise selecting, based on an indication of the gray color and/or the gray value set, a Bayer matrix dithering threshold map. In some examples, a Bayer matrix dithering threshold map (e.g., the Bayer matrix dithering threshold map 120A as shown in FIG. 1) may comprise a pre-set threshold map tiled across an image, video frame, graphical user interface, and/or the like as described herein that is configured to facilitate ordered dithering. In some examples, the operation 708 may comprise loading first dither map data representing a first threshold map (and/or a first dither map) and/or loading second dither map data representing a second threshold map (and/or a second dither map). For example, the Bayer matrix dithering threshold map may be loaded into device memory, such as before or after loading another dither map. In some examples, the first threshold map is a Bayer threshold map and the second threshold map is a non-Bayer threshold map (or vice versa).

The process 700 may continue at operation 710, at which the electronic device 600 (or the like as described herein) may activate (and/or deactivate) (e.g., based, at least in part, on the gray value set and the Bayer matrix dithering threshold map and/or the color filter array map) one or more pixels (e.g., a pixel at a respective location or portion of the display). In some examples, the process 700 may be performed iteratively for each distinct pixel of the display, for instance, the operations 702-710 may be repeated for each pixel associated with one or more gray colors. In some examples, the operation 710 may comprise mapping the Bayer matrix dithering threshold map (and/or the color filter array map) to a respective pixel set (and/or a respective pixel) of a respective portion of the RGB display. In some examples, the operation 710 may comprise activating, based, at least in part, on the Bayer matrix dithering threshold map (and/or the color filter array map) and the gray value set, a respective pixel set of a respective portion of the RGB display. For example, the electronic device 600 may determine that data for an image indicates that a portion of the image is to be rendered in mid-gray. In some such examples, the electronic device 600 may activate a set of pixels (e.g., at a location on the display as defined by pixel coordinates of the data) using a respective gray value set for the mid-gray color (e.g., {0.5, 0.5, 0.5}). In some examples, the operation 710 may comprise activating, based on the Bayer matrix dithering threshold map and the binary value set, at least in part, a respective pixel set by applying a common RGB value to a red pixel subset, a green pixel subset, and a blue pixel subset of the respective pixel set (e.g., in order to cause rendering of the gray color on the respective portion of the RGB display). The respective pixel set may comprise one or more pixels. In some examples, the operation 710 may comprise updating, based on the first dithered pixel color data and the second dithered pixel color data, the display assembly by causing the thin film transistor assembly to effect movement of one or more of the first color components corresponding to the first pixel location and effect movement of one or more of the first color components corresponding to the second pixel location. In some examples, the first pixel color data may indicate a set of color channel values corresponding to a gray color. Additionally, or alternatively, second pixel color data may indicate a set of color channel values corresponding to a non-gray color.

The electronic device 600 may produce a mid-gray color with a first texture appearance (e.g., the second coarse texture 406A as shown in FIG. 2), using Bayer matrix dithering threshold map, by activating the red pixels, activating half of the green pixels, and deactivating the blue pixels in a respective portion of the RGB display. Additionally, or alternatively, the electronic device 600 may produce the same, or similar, mid-gray color with a second texture appearance (e.g., a fine texture similar to the fine texture 204A as shown in FIG. 2, the first coarse texture 404A as shown in FIG. 2, and/or the like as described herein), using an alternating dithering threshold map (e.g., the alternating dithering threshold map 300 as shown in FIG. 3 and/or the like as described herein), by activating the red pixels, activating half of the green pixels, and deactivating the blue pixels in a respective portion of the RGB display.

The process 700 may continue at operation 712, at which the electronic device 600 (or the like as described herein) may select a color value set representing a tertiary color or a binary color. In some examples, the operation 712 may comprise determining a tertiary RGB color and/or a binary color (e.g., from the data as described above at the operation 702) to render on a respective portion of the RGB display. Example tertiary RGB colors may include, without limitation, spring green, chartreuse-green, orange, rose, violet, azure, and/or any other non-gray colors that may be produced by varying at least one of the red value, the green value, and/or the blue value between 0% (e.g., an integer value of 0 in the 8-bit RGB color space) and 100% (e.g., an integer value of 255 in the 8-bit RGB color space). In some examples, the operation 712 may comprise selecting, based on an indication of the tertiary RGB color in the received data and/or the tertiary color dithering threshold map (as described below at operation 714), a tertiary color value set comprising a red value, a green value, and a blue value. In some examples, at least one of the red value, the green value, or the blue value is greater than 0% (e.g., an integer value of 0 in the 8-bit RGB color space) and less than 100% (e.g., an integer value of 255 in the 8-bit RGB color space). In some examples, the red value may be applied to a red pixel subset, the green value may be applied to a green pixel subset, and the blue value may be applied to a blue pixel subset of a respective pixel set (e.g., in order to cause rendering of a tertiary color). In some examples, the tertiary color value set may cause rendering of the tertiary color when mapped to a respective pixel set of the respective portion of the RGB display. For example, if the electronic device 600 determines that the tertiary color is orange then the electronic device 600 may select (e.g., from a lookup table, a database, etc.) a respective tertiary (e.g., orange) value set of {1, 0.5, 0} to apply to the respective pixel set of the respective portion of the display. The respective pixel set may comprise one or more pixels.

In some examples, the operation 712 may comprise selecting a binary value set representing a binary color. In some examples, the operation 712 may comprise selecting, based on an indication of the binary color in the received data, a binary color map. In some examples, a binary color map may comprise a color filter map or a color filter array map (e.g., the color filter array map 116A as shown in FIG. 1) based on the physical layout of the color filters in the display of the electronic device 600. In some examples, the binary color map may comprise a Bayer matric dithering threshold map or an alternating dithering threshold map as described herein. In some examples, the operation 712 may comprise selecting (e.g., based, at least in part, on the binary color and the binary color map) a binary value set comprising a red binary value, a green binary value, and/or a blue binary value. In some examples, a binary value (e.g., the red binary value, the green binary value, and/or the blue binary value) may comprise, represent, or indicate a pixel activation value equal to 100% (e.g., an integer value of 255 in the 8-bit RGB color space) or 0% (e.g., an integer value of 0 in the 8-bit RGB color space). In some examples, the binary value set may cause rendering of the binary color when mapped to a respective pixel set of the respective portion of the RGB display. For example, if the electronic device 600 determines that the binary color is red then the electronic device 600 may select (e.g., from a lookup table, a database, etc.) a respective binary value set of {1, 0, 0} to apply to the respective pixel set of the respective portion of the display. The respective pixel set may comprise one or more pixels. In some examples, the operation 712 may comprise determining to use the second dither map for a second pixel location based on second pixel color data for the second pixel location that indicates a set of color channel values for the second pixel location. In some examples, the operation 712 may comprise determining, based on the second pixel color data and the second dither map, second dithered pixel color data for the second pixel location.

The process 700 may continue at operation 714, at which the electronic device 600 (or the like as described herein) may select (e.g., based on an indication of a color, such as a binary color or a tertiary color, in the received data as described above at the operation 702) a dithering threshold map. In some examples, the dithering threshold map may be selected from among a plurality of dithering threshold maps comprising any or all threshold maps as described herein. For example, if a tertiary color is detected then the electronic device 600 may select a tertiary color dithering threshold map. Additionally, or alternatively, if a binary color is detected then the electronic device 600 may select a corresponding color filter map. In some examples, the electronic device 600 may select a single alternating dithering threshold map for binary colors and tertiary colors. In some examples, a respective tertiary color dithering threshold map may be configured for a respective tertiary color (e.g., orange, etc.). For example, the electronic device 600 may be configured with a first tertiary color dithering threshold map for a first color and a second tertiary color dithering threshold map for a second color. In some examples, the operation 714 may comprise selecting, based on the tertiary RGB color and/or the tertiary color value set, a tertiary color dithering threshold map indicating an alternating pattern of threshold activation values. In some examples, a tertiary color dithering threshold map may comprise, at least in part, the alternating dithering threshold map 300 as shown in FIG. 3 and described above. In some examples, the operation 714 may comprise loading first dither map data representing a first threshold map (and/or a first dither map) and/or loading second dither map data representing a second threshold map (and/or a second dither map). For example, a dithering threshold map may be loaded into device memory, such as before or after loading another dither map. In some examples, the first threshold map is a non-Bayer threshold map and the second threshold map is a Bayer threshold map (or vice versa).

The process 700 may continue at operation 716, at which the electronic device 600 (or the like as described herein) may activate (and/or deactivate) (e.g., based, at least in part, on the color value set and the dithering threshold map and/or the color filter array map) one or more pixels (e.g., a pixel at a respective location or portion of the display). In some examples, the process 700 may be performed iteratively for each distinct pixel of the display, for instance, the operations 702, 704, and 712-716 may be repeated for each pixel associated with one or more tertiary (and/or any other higher order) colors. In some examples, the operation 716 may comprise mapping the tertiary color dithering threshold map to a respective pixel set (and/or a respective pixel) of a respective portion of the RGB display. In some examples, the operation 716 may comprise activating, based, at least in part, on the tertiary color dithering threshold map (and/or the color filter array map) and the tertiary color value set, a respective pixel set of a respective portion of the RGB display by applying the tertiary color value set to the respective pixel set (e.g., in order to cause rendering of the tertiary RGB color on the RGB display). For example, the electronic device 600 may determine that data for a video frame indicates that a portion of the video frame is to be rendered in orange. In some such examples, the electronic device 600 may activate a set of pixels (e.g., at a location on the display as defined by pixel coordinates of the data) using a respective tertiary color value set for the orange color (e.g., {1, 0.5, 0}). In some examples, the tertiary color value set may comprise a red value, a green value, and a blue value that is configured to cause rendering of a respective color on an RGB display.

In some examples, the operation 716 may comprise assigning, based on the tertiary color dithering threshold map, a first threshold activation value to at least a first pixel of a pixel set (e.g., associated with a location of a display). In some such examples, the alternating pattern of threshold activation values may comprise a set of values from 0% (e.g., an integer value of 0 in the 8-bit RGB color space) to 100% (e.g., an integer value of 255 in the 8-bit RGB color space). In some examples, the operation 716 may comprise assigning, based on the tertiary color dithering threshold map, a second threshold activation value to at least a second pixel of the pixel set. In some such examples, the second threshold activation value is different from the first threshold activation value. In some examples, the operation 716 may comprise determining whether the first threshold activation value is equal to, or greater than, a first respective color value. In some such examples, the first respective color value is one of the red value, the green value, or the blue value. In some examples, the operation 716 may comprise determining whether the second threshold activation value is equal to, or greater than, a second respective color value. In some such examples, the second respective color value is one of the red value, the green value, or the blue value. In some examples, the operation 716 may comprise activating, in an instance that the first threshold activation value is equal to, or greater than, the first respective color value, the first pixel of the pixel set. In some examples, the operation 716 may comprise activating, in an instance that the second threshold activation value is equal to, or greater than, the second respective color value, the second pixel of the pixel set.

The electronic device 600 may produce an orange color with a first texture appearance (e.g., the fine texture 204A as shown in FIG. 2), using a tertiary color dithering threshold map, by activating the red pixels, activating half of the green pixels, and deactivating the blue pixels in a respective portion of the RGB display (e.g., as shown in FIG. 2 by the dithering threshold map 204B). Additionally, or alternatively, the electronic device 600 may produce the same, or similar, orange color with a second texture appearance (e.g., the coarse texture 206A as shown in FIG. 2), using a Bayer matrix dithering threshold map, by activating the red pixels, activating half of the green pixels, and deactivating the blue pixels in a respective portion of the RGB display (e.g., as shown in FIG. 2 by the dithering threshold map 206B).

In some examples, the operation 716 may comprise activating (and/or deactivating) (e.g., based, at least in part, on the binary value set and the color filter array map as described above at the operation 712) one or more pixels (e.g., a pixel at a respective location or portion of the display). In some examples, the process 700 may be performed iteratively for each distinct pixel of the display, for instance, the operations 702, 704, and 712-716 may be repeated for each pixel associated with one or more binary colors. In some examples, the operation 716 may comprise mapping the binary color map to a respective pixel set (and/or a respective pixel) of a respective portion of the RGB display. In some examples, the operation 716 may comprise activating, based, at least in part, on the binary value set, a respective pixel set of a respective portion of the RGB display. For example, the electronic device 600 may determine that data for a webpage indicates that a top header of a webpage is to be rendered in blue. In some such examples, the electronic device 600 may activate a set of pixels (e.g., along the top of the display as defined by pixel coordinates of the data) using a respective binary value set for the color blue (e.g., {0, 0, 1}). In some examples, the operation 716 may comprise activating, based on the binary color map and the binary value set, at least in part, a respective pixel set. In an instance the binary color is black, activating the respective pixel set may comprise deactivating the respective pixel set. The respective pixel set may comprise one or more pixels. For example, the electronic device 600 may determine that data for a webpage indicates that a border around the webpage is to be rendered in black. In some such examples, the electronic device 600 may deactivate a set of pixels (e.g., around the edges of the display as defined by pixel coordinates of the data) using a respective binary value set for the color black (e.g., {0, 0, 0}). In some examples, the operation 716 may comprise rendering (or displaying) the binary color on a display of an electronic device.

In some examples, the operation 716 may comprise updating, based on the first dithered pixel color data and the second dithered pixel color data, the display assembly by causing the thin film transistor assembly to effect movement of one or more of the first color components corresponding to the first pixel location and effect movement of one or more of the first color components corresponding to the second pixel location.

As set forth above, certain methods, processes, operations, blocks, or components may be skipped (or omitted) in some examples. Blocks, components, or operations may be added to, or removed from, some examples. The methods and processes described herein are also not limited to any particular sequence or order, and the blocks or operations relating thereto can be performed in other sequences or orders that are appropriate. For example, described blocks or operations may be performed in an order other than that specifically disclosed, or multiple blocks or operations may be combined in a single block or state. For instance, two or more blocks or operations may be executed concurrently or with partial concurrence. The example blocks or operations may be performed in serial, in parallel, or in some other manner. For example, the order of execution of two or more blocks or operations may be scrambled relative to the order described. For instance, two or more blocks or operations may be executed concurrently or with partial concurrence. In some examples, described blocks, components, or materials may be assembled in an order other than that specifically disclosed, or multiple blocks may be combined into a single block, state, or layer. For example, the order of an optical film stack comprising two or more blocks or layers may be scrambled (or reordered) relative to the order described. It is understood that all such variations are within the scope of the present disclosure.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. The various features and processes described above may be used independently of one another or may be combined in various ways. All possible combinations and sub-combinations are intended to fall within the scope of this disclosure.

In addition, conditional language, such as, among others, "can," "could," "might," or "may," unless specifically stated otherwise, or otherwise understood within the context as used, is generally intended to convey that certain embodiments include, while other embodiments do not include, certain features, elements and/or steps.

In addition, example numerical values and/or terms, such as, among others "0%," "50%," "75%," 100%," "all," "half," and/or the like are given as non-limiting examples for illustrative purposes and to facilitate clearer description of the example embodiments and/or implementations and should not be interpreted as absolute values unless specifically stated otherwise, or otherwise understood within the context of a given example. The use of such example numerical values and/or terms (in the present disclosure, claims, and/or figures) are provided as approximate examples (e.g., to within a ±10% tolerance or any other number), unless specifically stated otherwise, or otherwise understood within the context of a given example.

Various example systems and processes described herein may include, or be implemented using, or in conjunction with, or for, a dithering threshold map which may also be referred to was a dither map in some examples. Although this disclosure has been described in terms of certain example embodiments and applications, other embodiments and applications that are apparent to those of ordinary skill in the art, including embodiments and applications that do not provide all of the benefits described herein, are also within the scope of this disclosure. The scope of the inventions is defined only by the claims, which are intended to be construed without reference to any definitions that may be explicitly or implicitly included in any incorporated-by-reference materials.

What is claimed is:

1. A method for utilizing different dithering threshold maps to render different colors from Red Green Blue (RGB) color filters, the method comprising:

determining a gray color to render on a first portion of an RGB display, wherein the gray color has a saturation measure equal to 0%;

selecting, based on the gray color and a Bayer matrix dithering threshold map, a gray value set comprising a common RGB value, wherein the common RGB value is greater than 0% and less than 100%;

activating, based on the Bayer matrix dithering threshold map, a first pixel set by applying the common RGB value to a red pixel subset, a green pixel subset, and a blue pixel subset of the first pixel set to cause rendering of the gray color on the first portion of the RGB display;

determining a tertiary RGB color to render on a second portion of the RGB display;

selecting, based on the tertiary RGB color, a tertiary color dithering threshold map indicating an alternating pattern of threshold activation values;

selecting, based on the tertiary RGB color and the tertiary color dithering threshold map, a tertiary color value set comprising a red value, a green value, and a blue value, wherein at least one of the red value, the green value, or the blue value is greater than 0% and less than 100%; and activating, based on the tertiary color dithering threshold map, a second pixel set by applying the tertiary color value set to the second pixel set to cause rendering of the tertiary RGB color on the RGB display.

2. The method of claim 1, wherein activating the second pixel set of the second portion of the RGB display comprises:

assigning, based on the tertiary color dithering threshold map, a first threshold activation value to at least a first pixel of the second pixel set, wherein the alternating pattern of threshold activation values comprises a set of values from 0% to 100%;

assigning, based on the tertiary color dithering threshold map, a second threshold activation value to at least a second pixel of the second pixel set, wherein the second threshold activation value is different from the first threshold activation value;

determining whether the first threshold activation value is equal to, or greater than, a first respective color value, wherein the first respective color value is one of the red value, the green value, or the blue value; and determining whether the second threshold activation value is equal to, or greater than, a second respective color value, wherein the second respective color value is one of the red value, the green value, or the blue value.

3. The method of claim 2, wherein activating the second pixel set of the second portion of the RGB display comprises:

activating, in an instance that the first threshold activation value is equal to, or greater than, the first respective color value, the first pixel of the second pixel set; and activating, in an instance that the second threshold activation value is equal to, or greater than, the second respective color value, the second pixel of the second pixel set.

4. A method comprising:

determining a tertiary RGB color;

selecting, using data representing the tertiary RGB color, a dithering threshold map indicating a pattern of alternating threshold values;

selecting, based on the tertiary RGB color and the dithering threshold map, a tertiary color value set comprising a red value, a green value, and a blue value;

mapping, based on the dithering threshold map, a first value of the alternating threshold values to a first pixel of a first pixel set of a first portion of a display, wherein the first pixel set comprises at least one pixel; and activating, based on the tertiary color value set and the dithering threshold map, the first pixel of the first pixel set.

5. The method of claim 4, comprising:

determining a gray color to render on a second portion of the display;

selecting, based on the gray color, a Bayer matrix dithering threshold map; and mapping the Bayer matrix dithering threshold map to a second pixel set of the second portion of the display, wherein the second pixel set comprises at least one pixel.

6. The method of claim 5, wherein the Bayer matrix dithering threshold map comprises a matrix divisible by 2, wherein the dithering threshold map comprises a matrix divisible by 3.

7. The method of claim 5, comprising:

selecting, based on the gray color and the Bayer matrix dithering threshold map, a gray value set comprising a common RGB value, wherein the common RGB value is greater than 0% and less than 100%, wherein the common RGB value is applied to at least one of a red pixel subset, a green pixel subset, and a blue pixel subset of the second pixel set, wherein a respective pixel subset comprises at least one respective pixel; and activating, based on the Bayer matrix dithering threshold map and the gray value set, a first pixel of the second pixel set.

8. The method of claim 4, comprising:

assigning, based on the dithering threshold map, a first threshold activation value to at least the first pixel of the first pixel set, wherein the alternating threshold values comprise a set of values from 0% to 100%, wherein at least one of the red value, the green value, or the blue value is greater than 0% and less than 100%.

9. The method of claim 8, comprising:

determining whether the first threshold activation value is equal to, or greater than, a first respective color value, wherein the first respective color value is one of the red value, the green value, or the blue value.

10. The method of claim 9, wherein activating the first pixel of the first pixel set is based on the first threshold activation value being equal to, or greater than, the first respective color value.

11. The method of claim 10, comprising:

assigning, based on the dithering threshold map, a second threshold activation value to at least a second pixel of the first pixel set, wherein the second threshold activation value is different from the first threshold activation value.

12. The method of claim 11, comprising:

determining whether the second threshold activation value is equal to, or greater than, a second respective color value, wherein the second respective color value is one of the red value, the green value, or the blue value.

13. The method of claim 12, comprising:

activating, in an instance that the second threshold activation value is equal to, or greater than, the second respective color value, the second pixel of the first pixel set.

14. The method of claim 4, comprising:

determining a binary color to render on a third portion of the display;

selecting, based on the binary color, a binary color map, wherein the binary color map is at least one of a color filter array map, the dithering threshold map, or a Bayer matrix dithering threshold map; and mapping the binary color map to a third pixel set of the third portion of the display, wherein the third pixel set comprises at least one pixel.

15. The method of claim 14, wherein the binary color is at least one of a primary RGB color or a secondary RGB color, wherein the primary RGB color comprises red, green, or blue, wherein the secondary RGB color comprises cyan, magenta, yellow, black, or white, wherein the tertiary RGB color comprises spring green, chartreuse-green, orange, rose, violet, or azure.

16. The method of claim 15, comprising:

selecting, based on the binary color and the binary color map, a binary value set comprising a red binary value, a green binary value, and a blue binary value, wherein the red binary value, the green binary value, and the blue binary value indicate a respective value equal to 100% or 0%; and activating, based on the binary color map and the binary value set, a first pixel of the third pixel set, wherein, in an instance the binary color is black, activating the first pixel of the third pixel set comprises deactivating the first pixel of the third pixel set.

17. An electronic device comprising:

a display assembly comprising:

first color components having a first color and a first charge polarity, second color components having a second color different from the first color, a thin film transistor assembly, and a color filter array assembly;

one or more processors; and one or more computer readable media storing processor executable instructions which, when executed using the one or more processors, cause the electronic device to perform operations comprising:

loading first dither map data representing a first dither map, loading second dither map data representing a second dither map, determining to use the first dither map for a first pixel location based on first pixel color data for the first pixel location that indicates a set of color channel values for the first pixel location, determining, based on the first pixel color data and the first dither map, first dithered pixel color data for the first pixel location, determining to use the second dither map for a second pixel location based on second pixel color data for the second pixel location that indicates a set of color channel values for the second pixel location, determining, based on the second pixel color data and the second dither map, second dithered pixel color data for the second pixel location, and updating, based on the first dithered pixel color data and the second dithered pixel color data, the display assembly by causing the thin film transistor assembly to effect movement of one or more of the first color components corresponding to the first pixel location and effect movement of one or more of the first color components corresponding to the second pixel location.

18. The electronic device of claim 17, wherein the determining to use the first dither map for the first pixel location is based on first color filter array data indicating a color channel associated with the first pixel location.

19. The electronic device of claim 17, wherein the first dithered pixel color data is determined based on first color filter array data indicating a color channel associated with the first pixel location.

20. The electronic device of claim 17, wherein:

the first pixel color data indicates a set of color channel values corresponding to a gray color;

the second pixel color data indicates a set of color channel values corresponding to a non-gray color;

the first dither map is a Bayer threshold map; and the second dither map is a non-Bayer threshold map.

\* \* \* \* \*